(12) United States Patent
Smyers

(10) Patent No.: US 7,944,952 B2
(45) Date of Patent: *May 17, 2011

(54) ASYNCHRONOUS DATA PIPE FOR AUTOMATICALLY MANAGING ASYNCHRONOUS DATA TRANSFERS BETWEEN AN APPLICATION AND A BUS STRUCTURE

(75) Inventor: Scott D. Smyers, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 154 days.

This patent is subject to a terminal disclaimer.

(21) Appl. No.: 12/488,338

(22) Filed: Jun. 19, 2009

(65) Prior Publication Data

US 2009/0268760 A1 Oct. 29, 2009

Related U.S. Application Data

(63) Continuation of application No. 11/514,751, filed on Aug. 31, 2006, now Pat. No. 7,567,590, which is a continuation of application No. 10/346,657, filed on Jan. 16, 2003, now Pat. No. 7,145,921, which is a continuation of application No. 08/612,321, filed on Mar. 7, 1996, now Pat. No. 6,519,268.

(51) Int. Cl.
*H04J 1/16* (2006.01)
(52) U.S. Cl. .................................. 370/536; 370/389
(58) Field of Classification Search .................. None
See application file for complete search history.

(56) References Cited

U.S. PATENT DOCUMENTS 3,836,722 A 9/1974 Muller et al.
(Continued)

FOREIGN PATENT DOCUMENTS

EP 0 267 974 A1 5/1988
(Continued)

OTHER PUBLICATIONS 1394 200 Mb/s Physical Layer Transceiver, IBM Microelectronics, Product Data Sheet and Application Notes, Version 1.4, Mar. 14, 1996.

(Continued)

*Primary Examiner* — Ajit Patel
(74) *Attorney, Agent, or Firm* — Haverstock & Owens LLP

(57) ABSTRACT

An asynchronous data pipe (ADP) automatically generates transactions necessary to complete asynchronous data transfer operations for an application over a bus structure. The ADP includes a register file which is programmed and initiated by the application. The register file includes the bus speed, transaction label, transaction code, destination node identifier, destination offset address, length of each data packet, packet counter, packet counter bump field, control field and a status field. During a data transfer operation, the ADP generates the transactions necessary to complete the operation over the appropriate range of addresses, using the information in the register file as a template. The ADP increments the value in the destination offset address field for each transaction according to the length of each data packet, unless the incrementing feature has been disabled and the transactions are to take place at a fixed address. The packet counter represents the number of transactions remaining to be generated. The packet counter value is decremented after each packet of data is transferred. The application can increment the packet counter value by writing to the packet counter bump field. A multiplexer is included within a system having multiple ADPs for multiplexing the information from the ADPs onto the bus structure. A demultiplexer is included within a system having multiple ADPs for routing information from the bus structure to the appropriate ADP.

10 Claims, 3 Drawing Sheets

U.S. PATENT DOCUMENTS

| | | | |
|---|---|---|---|
| 3,889,236 A | 6/1975 | Herger et al. |
| 3,906,484 A | 9/1975 | Melvin, Jr. et al. |
| 4,067,059 A | 1/1978 | Derchak |
| 4,218,756 A | 8/1980 | Fraser |
| 4,379,294 A | 4/1983 | Sutherland et al. |
| 4,395,710 A | 7/1983 | Einolf, Jr. et al. |
| 4,409,656 A | 10/1983 | Anderson et al. |
| 4,493,021 A | 1/1985 | Agrawal et al. |
| 4,507,732 A | 3/1985 | Catiller et al. |
| 4,633,392 A | 12/1986 | Vincent et al. |
| 4,641,307 A | 2/1987 | Russell |
| 4,739,323 A | 4/1988 | Miesterfeld et al. |
| 4,857,910 A | 8/1989 | Braunach |
| 4,897,783 A | 1/1990 | Nay |
| 4,972,470 A | 11/1990 | Farago |
| 4,998,245 A | 3/1991 | Tanaka et al. |
| 5,005,151 A | 4/1991 | Kurkowski |
| 5,008,879 A | 4/1991 | Fischer et al. |
| 5,117,070 A | 5/1992 | Ueno et al. |
| 5,191,418 A | 3/1993 | Tran |
| 5,276,684 A | 1/1994 | Pearson |
| 5,301,287 A | 4/1994 | Herrell et al. |
| 5,307,491 A | 4/1994 | Feriozi et al. |
| 5,325,510 A | 6/1994 | Frazier |
| 5,343,469 A | 8/1994 | Oshima |
| 5,359,713 A | 10/1994 | Moran et al. |
| 5,361,261 A | 11/1994 | Eden et al. |
| 5,369,773 A | 11/1994 | Hammerstrom |
| 5,400,340 A | 3/1995 | Hillman et al. |
| 5,402,419 A | 3/1995 | Osakabe et al. |
| 5,412,698 A | 5/1995 | Van Brunt et al. |
| 5,420,573 A | 5/1995 | Tanaka et al. |
| 5,444,709 A | 8/1995 | Riddle |
| 5,446,854 A | 8/1995 | Khalidi et al. |
| 5,465,402 A | 11/1995 | Ono et al. |
| 5,475,860 A | 12/1995 | Ellison et al. |
| 5,487,153 A | 1/1996 | Hammerstrom et al. |
| 5,493,570 A | 2/1996 | Hillman et al. |
| 5,497,466 A | 3/1996 | Roden et al. |
| 5,499,344 A | 3/1996 | Elnashar et al. |
| 5,506,846 A | 4/1996 | Edem et al. |
| 5,509,126 A | 4/1996 | Oprescu et al. |
| 5,517,662 A | 5/1996 | Coleman et al. |
| 5,519,701 A | 5/1996 | Colmant et al. |
| 5,524,213 A | 6/1996 | Dais et al. |
| 5,526,353 A | 6/1996 | Henley et al. |
| 5,533,018 A | 7/1996 | DeJager et al. |
| 5,535,208 A | 7/1996 | Kawakami et al. |
| 5,537,408 A | 7/1996 | Branstad et al. |
| 5,544,324 A | 8/1996 | Edem et al. |
| 5,546,389 A | 8/1996 | Wippenbeck et al. |
| 5,546,553 A | 8/1996 | Robertson et al. |
| 5,548,587 A | 8/1996 | Bailey et al. |
| 5,550,802 A | 8/1996 | Worsley et al. |
| 5,559,796 A | 9/1996 | Edem et al. |
| 5,559,967 A | 9/1996 | Oprescu et al. |
| 5,566,174 A | 10/1996 | Sato et al. |
| 5,586,264 A | 12/1996 | Belknap et al. |
| 5,594,732 A | 1/1997 | Bell et al. |
| 5,594,734 A | 1/1997 | Worsley et al. |
| 5,602,853 A | 2/1997 | Ben-Michael et al. |
| 5,603,058 A | 2/1997 | Belknap et al. |
| 5,606,559 A | 2/1997 | Badger et al. |
| 5,615,382 A * | 3/1997 | Gavin et al. ................. 710/53 |
| 5,617,419 A | 4/1997 | Christensen et al. |
| 5,619,646 A | 4/1997 | Hoch et al. |
| 5,632,016 A | 5/1997 | Hoch et al. |
| 5,634,034 A | 5/1997 | Foster |
| 5,640,392 A | 6/1997 | Hayashi |
| 5,640,592 A | 6/1997 | Rao |
| 5,646,941 A | 7/1997 | Nishimura et al. |
| 5,647,057 A | 7/1997 | Roden et al. |
| 5,652,584 A | 7/1997 | Yoon |
| 5,655,138 A | 8/1997 | Kikinis |
| 5,659,780 A | 8/1997 | Wu |
| 5,664,124 A * | 9/1997 | Katz et al. .................. 710/315 |
| 5,668,948 A | 9/1997 | Belknap et al. |
| 5,673,425 A | 9/1997 | Iwashita |
| 5,682,493 A | 10/1997 | Yung et al. |
| 5,684,954 A | 11/1997 | Kaiserswerth et al. |
| 5,687,174 A | 11/1997 | Edem et al. |
| 5,687,316 A | 11/1997 | Graziano et al. |
| 5,689,244 A | 11/1997 | Iijima et al. |
| 5,689,678 A | 11/1997 | Stallmo et al. |
| 5,692,211 A * | 11/1997 | Gulick et al. ................. 712/35 |
| 5,694,555 A | 12/1997 | Morris et al. |
| 5,696,924 A | 12/1997 | Robertson et al. |
| 5,701,302 A | 12/1997 | Geiger |
| 5,704,052 A | 12/1997 | Wu et al. |
| 5,706,439 A | 1/1998 | Parker |
| 5,708,779 A | 1/1998 | Graziano et al. |
| 5,710,773 A | 1/1998 | Shiga |
| 5,751,951 A | 5/1998 | Osborne et al. |
| 5,752,076 A | 5/1998 | Munson |
| 5,758,075 A | 5/1998 | Graziano et al. |
| 5,761,430 A | 6/1998 | Gross et al. |
| 5,761,457 A | 6/1998 | Gulick |
| 5,761,464 A | 6/1998 | Hopkins |
| 5,774,683 A | 6/1998 | Gulick |
| 5,781,599 A | 7/1998 | Shiga |
| 5,784,712 A | 7/1998 | Byers et al. |
| 5,787,101 A | 7/1998 | Kelly |
| 5,787,256 A | 7/1998 | Marik et al. |
| 5,787,298 A | 7/1998 | Broedner et al. |
| 5,790,743 A | 8/1998 | Sugiyama et al. |
| 5,793,953 A | 8/1998 | Yueng et al. |
| 5,799,041 A | 8/1998 | Szkopek et al. |
| 5,812,883 A | 9/1998 | Rao |
| 5,815,678 A | 9/1998 | Hoffman et al. |
| 5,826,041 A | 10/1998 | Ogus |
| 5,828,416 A | 10/1998 | Ryan |
| 5,828,903 A | 10/1998 | Sethuram et al. |
| 5,832,245 A | 11/1998 | Gulick |
| 5,835,726 A | 11/1998 | Shwed et al. |
| 5,835,793 A | 11/1998 | Li et al. |
| 5,841,771 A | 11/1998 | Irwin et al. |
| 5,848,253 A | 12/1998 | Walsh et al. |
| 5,872,569 A | 2/1999 | Salgado et al. |
| 5,872,983 A | 2/1999 | Walsh et al. |
| 5,875,312 A | 2/1999 | Walsh et al. |
| 5,884,103 A | 3/1999 | Terho et al. |
| 5,887,145 A | 3/1999 | Harari et al. |
| 5,915,019 A | 6/1999 | Ginter et al. |
| 5,938,752 A | 8/1999 | Leung et al. |
| 5,946,298 A | 8/1999 | Okuyama |
| 5,970,236 A | 10/1999 | Galloway et al. |
| 5,987,126 A | 11/1999 | Okuyama et al. |
| 5,991,520 A | 11/1999 | Smyers et al. |
| 6,085,270 A | 7/2000 | Gulick |
| 6,122,279 A | 9/2000 | Milway et al. |
| 6,205,538 B1 | 3/2001 | Yung |
| 6,233,637 B1 | 5/2001 | Smyers et al. |
| 6,243,783 B1 | 6/2001 | Smyers et al. |
| 6,266,727 B1 | 7/2001 | Smyers et al. |
| 6,272,499 B1 | 8/2001 | Wooten |
| 6,519,268 B1 | 2/2003 | Smyers |
| 6,584,099 B1 | 6/2003 | Sato et al. |
| 6,587,910 B2 | 7/2003 | Smyers et al. |
| 6,631,435 B1 | 10/2003 | Lym et al. |
| 6,901,474 B2 | 5/2005 | Lym et al. |
| 2005/0097245 A1 | 5/2005 | Lym et al. |

FOREIGN PATENT DOCUMENTS

| | | |
|---|---|---|
| EP | 0 428 111 A2 | 5/1991 |
| EP | 0 499 394 A1 | 8/1992 |
| EP | 0 578 013 A1 | 1/1994 |
| EP | 0 588 046 A1 | 3/1994 |
| EP | 0 651 329 A2 | 3/1995 |
| EP | 0 696 853 A2 | 2/1996 |
| EP | 0 632 391 B1 | 11/1999 |
| GB | 2 275 852 A | 9/1994 |
| JP | 63-129449 | 6/1988 |
| JP | 02-294749 | 12/1990 |
| JP | 03-095620 | 4/1991 |
| JP | 4-318649 | 11/1992 |
| JP | 630035 | 2/1994 |
| JP | 6-616932 | 6/1994 |

| | | |
|---|---|---|
| JP | 6-326968 | 11/1994 |
| JP | 7-182260 | 7/1995 |
| JP | 7-222263 | 8/1995 |
| JP | 7-327287 | 12/1995 |
| JP | 8-32644 | 2/1996 |
| JP | 10-243022 | 9/1998 |
| WO | 9205487 | 4/1992 |

OTHER PUBLICATIONS

"IEEE 1394-1995 Triple Cable Transceiver/Arbiter," Texas Instruments TSB21LV03, Product Review, Mar. 19, 1996.

"P1394 Standard for a High Performance Serial Bus", IEEE Standards Department, Jul. 7, 1995, Draft 8.0, vol. 2, pp. 1-414.

Bloks, R.H.J, "The IEEE-1394 High Speed Serial Bus" Phillip Journal of Research, vol. 50, No. 1/2, Jan. 1, 1996, pp. 209-216.

Kaiserswerth, Matthias, "The Parallel Protocol Engine", IEEE/ACM Transactions on Networking, vol. 1, No. 6, Dec. 1993, New York, pp. 650-663.

Krishnakumar et al.,"The Programmable Protocol VLSI Engine (PROVE)", 8089 IEEE Transactions on Communication, Aug. 1994,vol. 42, No. 8, pp. 2630-2642.

Teener, Michael,"A Bus on a Diet-The Serial Bus Alternative an Introduction to the P1394 High Performance Serial Bus", Apple Computer, Inc. Feb. 24, 1992, pp. 316-321.

"Local Area Network Protocol for Autonomous Control of Attached Devices," Software Patent Institute, Software Patent Institute Database of Software Technologies, Jul. 1990, Record 2, Serial No. TDB0790.0071.

"Architecture for High Performance Transparent Bridges" Software Patent Institute Database of Software Technologies, Jul. 1992, Record 10, Serial No. TDB0792.0100.

"Access to High-Speed LAN via Wireless Media", Software Patent Institute Database of Software Technologies, Apr. 1993, Record 1, Serial No. TDB0493.0199.

Heeter, Julia, "Asynchronous Transfer Mode", Dec. 12, 1995,IFSM 651 and 652, http://www.gl.umbc.edu/~jheete1/atmpaper.html.

Poo et al., "Data link driver program design for the IBM token ring network PC adapter", Computer Communications, 1989, London, Great Britain, pp. 266-272.

Anzaloni et al.,"Fiber Channel (FCS) / ATM interworking: A design solution", Ericsson Fatme R&D Division, Nov. 1993, pp. 1127-1133.

"Data Exchange Adapter for Micro Channel / 370" Software Patent Institute, Software Patent Institute Database of Software Technologies, Oct. 1991, Record 1, Serial No. TDB1091.0174.

Tischer, Michael, "PC Intern 4 Systemprogrammierung", pp. 162-181, Data Becker GmbH & Co KG, Jan. 1, 1994, Dusselfdorf, Germany.

* cited by examiner

| Offset | R/W | Function | | | |
|---|---|---|---|---|---|
| | | byte 0 (msb) | byte 1 | byte 2 | byte 3 (lsb) |
| 0 | RW | | sp | t1 | 00 | tCode | 0000 |
| 4 | RW | destination_ID | | | |
| 8 | RW | destination_offset Lo | | | destination_offset Hi |
| C | RW | data_length | | extended_tCode | |
| 10 | RW | Packet counter | | | |
| 14 | W | Packet counter bump | | | |
| 18 | RW | control | | | |
| 1C | RW | status | | | |

Map of ADP Control Registers

FIG. 3

ASYNCHRONOUS DATA PIPE FOR AUTOMATICALLY MANAGING ASYNCHRONOUS DATA TRANSFERS BETWEEN AN APPLICATION AND A BUS STRUCTURE

RELATED APPLICATIONS

This patent application is a continuation of U.S. patent application Ser. No. 11/514,751, filed on Aug. 31, 2006, and entitled "Asynchronous Data Pipe For Automatically Managing Asynchronous Data Transfers Between An Application And A Bus Structure," which is a continuation of U.S. patent application Ser. No. 10/346,657, filed on Jan. 16, 2003, and entitled "Asynchronous Data Pipe For Automatically Managing Asynchronous Data Transfers Between And Application And A Bus Structure" now issued as U.S. Pat. No. 7,145,921, which is a continuation of U.S. patent application Ser. No. 08/612,321, filed on Mar. 7, 1996, and entitled "Asynchronous Data Pipe For Automatically Managing Asynchronous Data Transfers Between And Application And A Bus Structure" now issued as U.S. Pat. No. 6,519,268. The application Ser. No. 11/514,751, filed on Aug. 31, 2006, and entitled "Asynchronous Data Pipe For Automatically Managing Asynchronous Data Transfers Between An Application And A Bus Structure," Ser. No. 10/346,657, filed on Jan. 16, 2003, and entitled "Asynchronous Data Pipe For Automatically Managing Asynchronous Data Transfers Between And Application And A Bus Structure" now issued as U.S. Pat. No. 7,145,921, and Ser. No. 08/612,321, filed on Mar. 7, 1996, and entitled "Asynchronous Data Pipe For Automatically Managing Asynchronous Data Transfers Between And Application And A Bus Structure" now issued as U.S. Pat. No. 6,519,268, are hereby incorporated by reference.

FIELD OF THE INVENTION

The present invention relates to the field of automatically managing data transfer operations between an application and a bus structure. More particularly, the present invention relates to the field of automatically generating transactions necessary to complete an asynchronous data transfer operation between an application and a bus structure.

BACKGROUND OF THE INVENTION

The IEEE 1394 standard, "P1394 Standard For A High Performance Serial Bus," Draft 8.01v1, Jun. 16, 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394 standard is very thin in size compared to other bulkier cables used to connect such devices. Devices can be added and removed from an IEEE 1394 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394 cable. The physical layer 16 also provides arbitration to ensure that all devices coupled to the IEEE 1394 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

To initialize an isochronous transfer, several asynchronous data transfers may be required to configure the applications and to determine the specific channel which will be used for transmission of the data. Once the channel has been determined, buffers are used at the transmitting application to store the data before it is sent and at the receiving application to store the data before it is processed. In some peripheral implementations, it is desirable for the peripheral to transfer large amounts of data using a large number of asynchronous transactions. In order to generate these transactions quickly and efficiently, it is not practical to require a general purpose CPU or microcontroller to construct each request packet.

What is needed is an asynchronous data pipe that provides automated generation of transactions necessary to complete an asynchronous data transfer operation, without requiring supervision by an API and the processor of an application.

SUMMARY OF THE INVENTION

An asynchronous data pipe (ADP) automatically generates transactions necessary to complete asynchronous data transfer operations for an application over a bus structure. The ADP includes a register file which is programmed by the application. The register file allows the application to program requirements and characteristics for the data transfer operation. The register file includes the bus speed, transaction label, transaction code, destination node identifier, destination offset address, length of each data packet, packet counter, packet counter bump field, control field and a status field. After the register file is programmed and initiated by the application, the ADP automatically generates tire read or write transactions necessary to complete the data transfer operation over the appropriate range of addresses, using the information in the register file as a template for generating the transactions and headers. The ADP automatically increments the value in the destination offset address field for each transaction according to the length of each data packet, unless an incrementing feature has been disabled, signalling that the transactions are to take place at a single address. The packet counter value represents the number of transactions remaining to be generated. The packet counter value is decremented after each packet of data is transferred. The packet counter bump field allows the application to increment the packet counter value by writing to the packet counter bump field.

Multiple ADPs can be included within a system for managing multiple asynchronous data transfer operations. In such a system, each ADP has its own unique transaction label value or range of values. A multiplexer is coupled to each ADP for multiplexing the transactions and data packets from the ADPs onto the bus structure. A demultiplexer is also coupled to each ADP for receiving signals and data packets from the bus structure and routing them to the appropriate ADP, using the transaction code and transaction label values.

BRIEF DESCRIPTION OF THE DRAWINGS

FIG. 3 illustrates a register file within each asynchronous data pipe.

DETAILED DESCRIPTION OF THE PREFERRED EMBODIMENT

Figure 1:
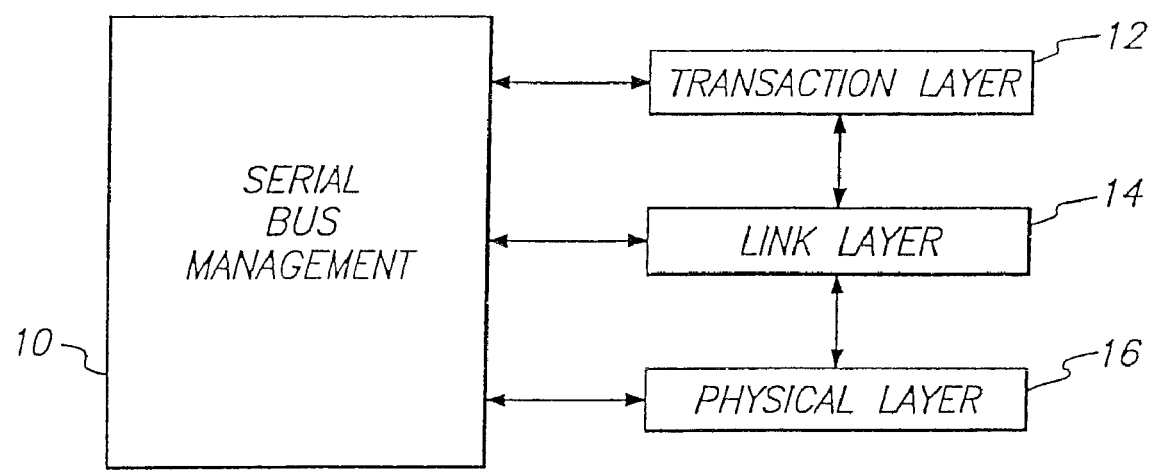
FIG. 1 illustrates a protocol defined by the IEEE 1394 standard.

An asynchronous data pipe according to the present invention automatically generates the asynchronous transactions necessary to implement asynchronous data transfers to and from an application over a bus structure. An application as used herein will refer to either an application or a device driver. The bus structure over which the data transfer operations are completed is preferably an IEEE 1394 standard bus structure. However, as will be apparent to those skilled in the art, the asynchronous data pipe of the present invention will also be applicable for use in managing data transfers over other types of bus structures. The asynchronous data pipe, at the direction of the application, includes the ability to transfer any amount of data between a local data buffer or FIFO, provided by the application and a range of addresses over the bus structure using one or more asynchronous transactions.

The asynchronous data pipe includes a register file which is programmed by the application when a data transfer operation is to be completed. The register file allows the application to program certain requirements for the data transfer operation, including the bus speed at which the transactions are to be generated, a transaction label and a transaction code, representing the type of transaction, an identifier for the destination node with, which the transfer is being conducted, a destination offset address, representing the starting address at which the transfer is taking place and a length of each data packet. The register file also includes a packet counter to keep track of the remaining number of packets to be generated, a packet counter, bump field to allow the application to increment the packet counter, a control field and a status field. The incrementing feature of the asynchronous data pipe can be turned off by the application if the transactions are to take place at a single address across the bus structure.

After the register file is programmed and initiated by the application, the asynchronous data pipe automatically generates the read or write transactions necessary to complete the data transfer operation over the appropriate range of addresses. The information in the register file is used as a template by the asynchronous data pipe, to generate the necessary transactions and appropriate headers for completing the data transfer operation. The asynchronous data pipe automatically increments the value in the destination offset address field for each transaction according to the size of the packets being transferred, unless the incrementing feature has been disabled. Because the asynchronous data pipe generates the required transactions automatically, direct processor control or supervision by the initiating application is not required. This allows the application to perform other functions and complete other tasks while the asynchronous data pipe of the present invention completes the data transfer operation. However, the register file includes the packet counter bump field which allows the application to increment the number of transactions remaining to be completed by the asynchronous data pipe. In this manner, the asynchronous data pipe has the ability to control the generation of the transactions necessary to complete a data transfer operation, if required.

A system can include multiple asynchronous data pipes for managing multiple asynchronous data transfer operations. In such a system a multiplexer is coupled between the bus structure and each of the asynchronous data pipes for multiplexing the transactions and the data packets from the asynchronous data pipe onto the bus structure. A demultiplexer is also coupled to each asynchronous data pipe for receiving signals and data packets from the bus structure and routing them to the appropriate asynchronous data pipe. The demultiplexer uses the transaction code and the transaction label values to determine which asynchronous data pipe is to received the information. Within the system, each asynchronous data pipe has its own unique transaction label value or range of values.

Figure 2:
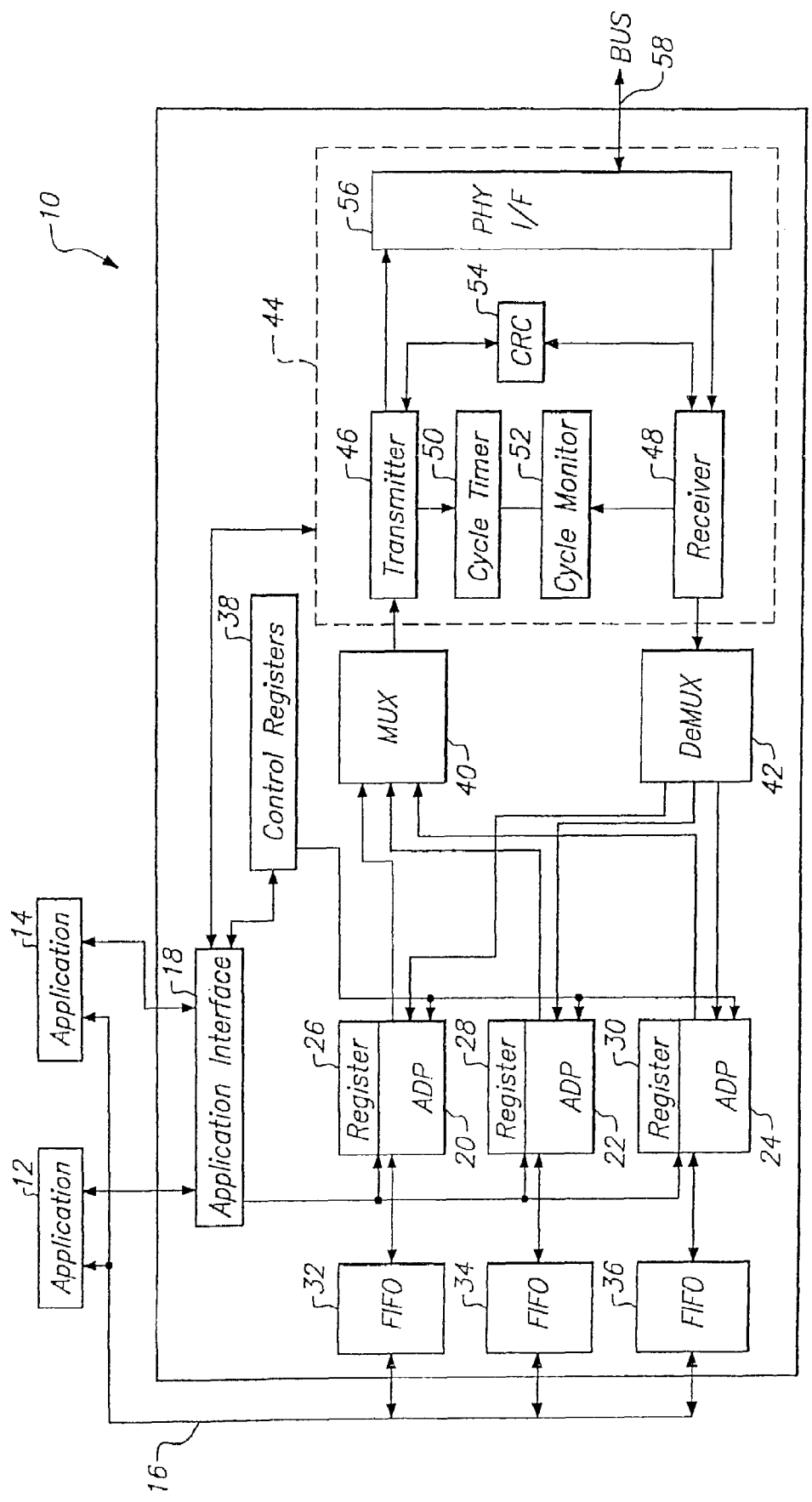
FIG. 2 illustrates a block diagram schematic of a link chip including three asynchronous data pipes according to the present invention.

A link circuit including three asynchronous data pipes (ADP), according to the present invention, is illustrated in FIG. 2. In the preferred embodiment, the link circuit 10 is formed on a single integrated circuit or chip. The link circuit 10 provides a link between applications 12 and 14 and a bus structure 58. The applications 12 and 14 are both coupled to a system bus 16. The system bus 16 is coupled to each of the first-in first-out data buffers (FIFOs) 32, 34 and 36. The applications 12 and 14 are also both coupled to an applications interface circuit 18. The applications interface circuit 18 is coupled to a set of control registers 38, to each asynchronous data pipe 20, 22 and 24 and to a link core 44. Each of the asynchronous data pipes 20, 22 and 24 include a register set 26, 28 and 30, respectively. Each of the FIFOs 32, 34 and 36 correspond to an appropriate one of the asynchronous data pipes 20, 22 and 24. The FIFO 32 is coupled to the asynchronous data pipe 20. The FIFO 34 is coupled to the asynchronous data pipe 22. The FIFO 36 is coupled to the asynchronous data pipe 24. The control registers 38 are also coupled to each of the asynchronous data pipes 20, 22 and 24. Each of the asynchronous data pipes 20, 22 and 24 are coupled to a multiplexer 40 for outbound data transfer operations and to a demultiplexer 42 for inbound data transfer operations. For purposes of this disclosure, an outbound data transfer is one from an application to the bus structure and an inbound data transfer is from the bus structure to an application.

The link core 44 includes a transmitter 46, a receiver 48, a cycle timer 50, a cycle monitor 52, a CRC error checking circuit 54 and a physical interface circuit 56 for physically interfacing to the bus structure 58. The transmitter 46 is coupled to the multiplexer 40, to the cycle timer 50, to the CRC error checking circuit 54 and to the physical interface circuit 56. The receiver 48 is coupled to the demultiplexer 42, to the cycle monitor 52, to the CRC error checking circuit 54 and to the physical interface circuit 56. The cycle timer 50 is coupled to the cycle monitor 52. The physical interface circuit 56 is coupled to the bus structure 58.

The system illustrated in FIG. 2 includes three asynchronous data pipes 20, 22 and 24. It should be apparent to those skilled in the art that a system could be implemented with any number of asynchronous data pipes 20, 22 and 24, depending on the specific requirements of the system. Each asynchronous data pipe provides a capability for automatically handling a data transfer operation for an application. Accordingly, as will become apparent from the following description, having additional asynchronous data pipes in a system, will increase the capability of the system, by providing the capacity to have simultaneously completing asynchronous data transfer operations.

Each asynchronous data pipe is a bi-directional data path for data to and from the application which is to be transmitted via asynchronous transactions across the bus structure 58. Prior to any asynchronous data pipe operation, some external entity must program a register file within the asynchronous data pipe. This external entity can be the application itself, or some other intelligence or state machine inside the system. In the preferred embodiment of the present invention the register file of the asynchronous data pipe is programmed by the application. Each asynchronous data pipe includes the ability to generate the required headers for outbound data and check and strip headers from inbound data, using the register file as a template.

The asynchronous data pipe register file contains data relating to the bus structure start address, the transaction type and the transaction size, as will be described in detail below. In the preferred embodiment, the transaction type is any one of the following: quadlet read; quadlet write; block read; or block write. The transaction size is four bytes in the case of a quadlet transaction or block request size in the case of block transactions.

When enabled, the asynchronous data pipe transfers application data using asynchronous transactions according to the parameters programmed in its register file. In the case of write transactions, from the application to another node coupled to the bus structure, the asynchronous data pipe takes application data available at its FIFO interface, prepends the appropriate header information to the data in the format required by the link core 44 and transfers the data to the link core 44 through the multiplexer 40. In the case of read transactions, from another node coupled to the bus structure, to the application, the asynchronous data pipe issues the appropriate read request packets and when the data is received routes the data in the corresponding read response packets to the application through the FIFO interface. In the case of both read and write transactions, the asynchronous data pipe organizes the data into bus structure specific packet formats, as required by the link core 44. The asynchronous data pipe also handles the address calculation for the transactions to an increasing range of addresses, necessary to complete the application's request. In other words, subsequent transactions are addressed at an incrementing range of addresses in the address space of the bus structure.

The FIFO interface for each asynchronous data pipe is coupled directly to a FIFO 32, 34 or 36 which is dedicated to the data path that the asynchronous data pipe controls. Each FIFO 32, 34 or 36 is dedicated to a single asynchronous data pipe. The link interface for each asynchronous data pipe is coupled through the multiplexer 40 and the demultiplexer 42 to the link core 44. The data presented from each asynchronous data pipe to the link core 44 is in a format required by the link core function. Each asynchronous data pipe is designed to receive the data coming from the link core 44 to be in the format defined by the link core specification. If more than one asynchronous data pipe is included within a system, each asynchronous data pipe is coupled to the link core 44 through the multiplexer 40 and the demultiplexer 42.

The data from the link core 44 to the asynchronous data pipes 20, 22 and 24 is routed through the demultiplexer 42. The demultiplexer 42 uses the transaction code and the transaction label, to route the data to the appropriate asynchronous data pipe. The demultiplexer 42 routes response packets from the bus structure 58 to the appropriate asynchronous data pipe using the transaction code field of the packet header and the value in the transaction label field of the packet header. The appropriate asynchronous data pipe will then match the response packets with the corresponding request packets.

The demultiplexer 42 does not change any information when it routes packets from the link core 44 to the appropriate asynchronous data pipe. All information produced by the link core is sent to the destination asynchronous data pipe. The asynchronous data pipe will perform all necessary manipulation of the data from the link core 44 before this data is transferred to the application, which may include stripping header information required by the protocol for the bus structure. For outbound data, the asynchronous data pipe prepares data from the application so that it is in the proper form required by the link core 44. Each asynchronous data pipe will generate the appropriate header information and embed that in the data from the application before sending the data to the link core 44 through the multiplexer 40.

For all of the asynchronous data pipes 20, 22 and 24, the link interface produces and consumes data in a format which is compatible with the requirements of the link core 44 function. During a write operation, the asynchronous data pipes 20, 22 and 24 generate the required bus structure specific header information and embed it in the data from the application, as required by the link core 44. During a read operation the asynchronous data pipe accepts that data in the format provided by the link core 44 for data moving from the link core 44 to one of the asynchronous data pipes 20, 22 and 24. In other words, no manipulation of the data is required to translate data from the link core 44 to the appropriate asynchronous data pipe 20, 22 or 24.

When only one asynchronous data pipe is included within a system, the asynchronous data pipe can be connected directly to the link core 44. When there are multiple asynchronous data pipes within a system, the system must include an appropriate multiplexer 40 and demultiplexer 42 between the asynchronous data pipes and the link core 44. The multiplexer 44 is responsible for taking the data at the link interfaces of the multiple asynchronous data pipes 20, 22 and 24 and multiplexing that data into the link core 44 and then onto the bus structure 58 on a packet by packet basis. This information is routed to the bus structure in a priority set by the transferring application. The demultiplexer 42 uses the value in the transaction code and transaction label fields of each packet received from the bus structure 58 and the value in the transaction label of the asynchronous response packet header, to route the packet to the proper asynchronous data pipe 20, 22 or 24.

The asynchronous data pipe of the present invention is a bidirectional data path between a corresponding FIFO and the link core 44. When transferring data from the corresponding FIFO to the link core 44, the asynchronous data pipe forms the appropriate header information and prepends it to the data before sending the resulting header and application data to the link core 44. The link block uses the information created by the asynchronous data pipe to generate and complete the write operation across the bus structure 58. When sending data from the link core 44 to a FIFO, the asynchronous data pipe creates the appropriate header information for a read transaction. The asynchronous data pipe sends this information to the link core 44 which then transmits the read request across the bus structure 58. At some later time, the responding node returns a read response packet. The link core 44 detects this response packet and transmits it to the demultiplexer 42 which then directs that data to the asynchronous data pipe which generated the read request, using the values in the transaction code and transaction label fields to determine the appropriate asynchronous data pipe. The asynchronous data pipe then strips the header information from the packet and sends the data to the corresponding FIFO. The application then processes the data from the FIFO. Whether generating read or write requests to be sent across the bus structure 58, the asynchronous data pipe continues to generate the appropriate requests until it has transported all the data to or from the application.

A system which includes multiple asynchronous data pipes can sustain multiple threads of data transfer concurrently. This is useful in embedded applications, such as disk drives, which may be transferring media data while reading subsequent commands or reporting status information to the initiating application. The demultiplexer 42 is responsible for directing the data properly to each asynchronous data pipe. In the preferred embodiment of the present invention, each asynchronous data pipe has a unique transaction label or range of transaction labels. The demultiplexer 42 determines the appropriate asynchronous data pipe according to the data in the transaction label and transaction code fields.

Each asynchronous data pipe has a dedicated register file, as will be described in detail below. The register file is programmed by external intelligence, such as the application originating the data transfer operation. Once the register file is programmed, an asynchronous data pipe can perform read and write transactions either to an increasing range of addresses or to a fixed address across the bus structure 58. These transactions can be either of a block or quadlet size. The application, when programming the data transfer operation, will either give a total block count for the transfer, "bump" the block counter by one count at a time, or provide a combination of the two. If a total block count for the transfer is programmed, the asynchronous data pipe will generate the transactions necessary to complete the operation while the application performs other operations and completes other tasks. Each asynchronous data pipe maintains the bus structure specific address pointer context and performs read or write transactions whenever the block counter has a non-zero value.

Each asynchronous data pipe requires a dedicated register file which is programmed by the originating application and used to generate the appropriate transactions necessary to complete a data transfer operation across the bus structure 58. The register file, required for each asynchronous data pipe, included within the preferred embodiment of the present invention is illustrated in FIG. 3. The register file 80 includes 32 bytes of data, numbered hexadecimally 0 through 1F. In FIG. 3, the register file 80 is illustrated in a table format with eight horizontal rows, each including four bytes. An offset column 82 is included in FIG. 3, to show the offset of the beginning byte in each row from the address of the beginning of the register file 80. A read/write column 84 is also included to show whether the fields in each row can be either read from and written to or written to only.

The speed field sp is a two-bit field within byte 1 of the register file 80. The speed field sp can be read from and written to. The speed field sp defines the bus speed at which all request packets will be generated. A write operation to this field updates the value in the speed field sp. A read operation to the speed field sp returns the last value written to the field. The value in the speed field is a two-bit value representing, the speed at which all request packets will be generated across the bus structure 58. Table I below defines the correlation of the speed to the value in the speed field sp.

TABLE I

| value | bus speed |
|-------|-----------|
| 00    | 100 Mbps  |
| 01    | 200 Mbps  |
| 10    | 400 Mbps  |
| 11    | Reserved  |

Therefore, as illustrated in Table I, a value of 00 in the speed field sp defines the bus speed at which all request packets are generated at 100 Mbps, a value of 01 corresponds to a bus speed for generating request packets at 200 Mbps, a value of 10 corresponds to a bus speed for generating request packets at 400 Mbps.

The transaction label field t1 is a six bit field within byte 2 of the register file 80. The transaction label field t1 can be read from and written to. The transaction label field t1 holds the value of the transaction label to use for all request packets generated by the corresponding asynchronous data pipe. In an alternate embodiment, a single asynchronous data pipe will manage a range of transaction labels. A mite operation to this field, updates the value in the transaction label t1 field. A read operation to the transaction label field t1 returns the last value written to the field. If there is more than one asynchronous data pipe within a system, each asynchronous data pipe must have a unique value in the transaction label field t1 in order for the demultiplexer 42 to properly route tire response packets to the originating asynchronous data pipe.

In the preferred embodiment, the two least significant bits of byte 2 of the register file 80 are both permanently programmed to a logical low voltage level.

The transaction code field tCode is a four bit field within byte 3 of the register file 80. The transaction code field tCode can be read from and written to. The transaction code field tCode holds the transaction code to use for all request packets generated by the corresponding asynchronous data pipe. A write operation to this field, updates the value in the transaction code field tCode. A read operation to the transaction code field tCode returns the last value written to the field. The value in the transaction code field tCode is a four bit value representing the type of operation to be conducted. The correlation between the values in the transaction code field tCode and the type of operation to be conducted is shown in Table II below.

TABLE II

| tCode | Operation |
|---|---|
| 0000 | write request for data quadlet |
| 0001 | write request for data block |
| 0100 | read request for data quadlet |
| 0101 | read request for data block |
| 1001 | lock request |

When the transaction code field tCode contains the value 0000, then the data transfer operation to be performed is a quadlet write operation. When the transaction code field tCode contains the value 0001, the data transfer operation to be performed is a block write operation. When the transaction code field tCode contains the value 0100, the data transfer operation to be performed is a quadlet read operation. When the transaction code field tCode contains the value 0101, the data transfer operation to be performed is a block read operation. When the transaction code field tCode contains the value 1001, the operation is a lock operation.

In the preferred embodiment, the four least significant bits of byte 3 of the register file 80 are all permanently programmed to a logical low voltage level, in order to provide a reserved field in the packet header for the bus structure.

The destination identifier field destination_ID is a sixteen bit field within bytes 4 and 5 of the register file 80. The destination identifier field destination_ID can be read from and written to. The destination identifier field destination_ID holds the sixteen bit destination node ID which is used with all request packets generated by the corresponding asynchronous data pipe for a data transfer operation. A write operation to this field, updates the value in the destination identifier field destination_ID. A read operation to the destination identifier field destination_ID returns the last value written to the field. The value in the destination identifier field destination_ID represents the node, across the bus structure 58, with which the data transfer operation is to take place. Therefore, each node on the bus structure 58 has a unique destination identifier.

The high order destination offset field destination_offset Hi is a sixteen bit field within bytes 6 and 7 of the register file 80. The high order destination offset field destination_offset Hi can be read from and written to. The high order destination offset field destination_offset Hi holds the high order sixteen bits of the destination offset address to use for the next request packet generated. A write operation to this field updates the value in the high order destination offset field destination_offset Hi. A read operation to the high order destination offset field destination_offset Hi returns the current value of the high order sixteen bits of the destination offset address.

The low order destination offset field destination_offset Lo is a thirty-two bit field within bytes 8 through B of the register file 80. The low order destination offset field destination_offset Lo can be read from and written to. The low order destination offset field destination_offset Lo holds the low order thirty-two bits of the destination offset address to use for the next request packet generated. A write operation to this field updates the value in the low order destination offset field destination_offset Lo. A read operation to the low order destination offset field destination_offset Lo returns the current value of the low order thirty-two bits of the destination offset address. Together, the high order destination offset field destination offset Hi and the low order destination offset field destination_offset Lo form the forty-eight bit destination offset address to which a current transaction is generated. If the non-incrementing flag in the control field, which will be discussed below, is at a logical low voltage level, then the asynchronous data pipe increments the entire forty-eight bit destination offset field, comprised of the high order destination offset field destination_offset Hi and the low order destination offset field destination_offset Lo, by the value in the data length field after each read or write transaction is generated.

The data length field data_length is a sixteen bit field within bytes C and D of the register file 80. The data length field data_length can be read from and written to. The data length field data_length holds the size, in bytes, of all request packets which are generated by the corresponding asynchronous data pipe. A write operation to this field updates the value in the data length field data_length. A read operation to the data length field data_length returns the last value written to this field. The value hi the data length field data_length has some restrictions, based on the values in the other fields of the register file 80, as defined in Table III below.

TABLE III

| Operation | tCode | extended tCode | sp | permitted data_length value (bytes) |
|---|---|---|---|---|
| quadlet read/quadlet write | 0100/0000 | 0000 | — | 4 |
| block read/block write | 0101/0001 | 0000 | 00 | 1 to 512 |
| block read/block write | 0101/0001 | 0000 | 01 | 1 to 1024 |
| block read/block write | 0101/0001 | 0000 | 10 | 1 to 2048 |
| mask_swap | 1001 | 0001 | — | 8 or 16 |
| compare_swap | 1001 | 0002 | — | 8 or 16 |
| fetch_add | 1001 | 0003 | — | 4 or 8 |
| little_add | 1001 | 0004 | — | 4 or 8 |
| bounded_add | 1001 | 0005 | — | 8 or 16 |
| wrap_add | 1001 | 0006 | — | 8 or 16 |
| vendor-dependent | 1001 | 0007 | — | — |

The extended transaction code field extended_tCode is a sixteen bit field within bytes E and F of the register file 80. The extended transaction code field extended_tCode can be read from and written to. A write operation to this field updates the value in the extended transaction code field extended_tCode. A read operation to the extended transaction code field extended_tCode returns the last value written to this field. The extended transaction code field extended_tCode has a value of zero for all transactions, except lock transactions. If the value in the transaction code field tCode is set to a value of 1001. signalling that this is a lock request, then the extended transaction code field extended_tCode holds the extended transaction code value for the lock transaction.

The packet counter field is an eight to thirty-two bit field, depending on the configuration of the system, within bytes 10-13 of the register file 80. The packet counter field can be read from and written to. The packet counter field holds the number of request packets remaining to be generated to complete a data transfer operation. A write operation to this field changes the value in the packet counter field. A read operation to the packet counter field returns the current packet count of request packets remaining to be generated. The value in the packet counter field is decremented after each transaction is generated. In order to have complete control of the number of packets generated, the packet counter field should only be written to when its value is zero.

The packet counter bump field is a write only field within bytes 14-17 of the register file 80. When the packet counter bump field is written to, the corresponding asynchronous data pipe increments the value in the packet counter register. If the packet counter bump field is read, the returned value is not predictable. This allows the originating application to have additional transactions generated for a current data transfer operation. In the preferred embodiment of the present invention, writing to the packet counter bump field is the only way to increment the value in the packet counter field when the packet counter field contains a non-zero value.

The control field is a thirty-two bit field within bytes 18-1B of the register file 80. The control field can be read from and written to. Within the control field, bits 0-29 are reserved, bit 30 is a non-incrementing control bit non_incr and bit 31 is a operational control bit go. The operational control bit go is set to a logical high voltage level in order to enable the asynchronous data pipe. Clearing the operational control bit go to a logical low voltage level disables the asynchronous data pipe immediately, or on the next transaction boundary if the asynchronous data pipe is currently in the middle of a transaction. Accordingly, an asynchronous data pipe is only operational when the operational control bit go is set to a logical high voltage level. The non-incrementing control bit non_incr is set to a logical high voltage level in order to force the asynchronous data pipe to generate all request packets to a fixed or non-incrementing address. When the non-incrementing control bit non_incr is equal to a logical low voltage level, the corresponding asynchronous data pipe increments the destination offset value by the value ha the data_length field after each transaction is completed.

The status field is a thirty-two bit field within bytes 1C-1F of the register file 80. The status field can be read from and written to. The status field holds the last acknowledge codes and response codes resulting from request packets generated by the corresponding asynchronous data pipe. The status field includes an error field, a response code field, an acknowledge in field and an acknowledge out field.

The error field is a four bit field which contains bits which indicate the error which caused the corresponding asynchronous data pipe to halt its operation. The error field is cleared when the operational control bit go is set to a logical high voltage level. The error field is valid when the operational control bit go is cleared to a logical low voltage level by the asynchronous data pipe. Table IV illustrates the relationship between the possible values in the error field and their meaning.

TABLE IV

| error value | meaning |
| --- | --- |
| 0000 | no error |
| 0001 | bad ack code received (for request packet) |
| 0010 | bad ack code sent (for response packet) |
| 0100 | split transaction time-out |
| 1000 | bus reset occurred |

A value of 0000 within the error field signals that there is no error. A value of 0001 within the error field signals that the error was caused because a bad acknowledge code was received for a request packet which was previously sent. A value of 0010 within the error field signals that the error was caused because a had acknowledge code was sent for a response packet. A value of 0100 within the error field signals that the error was caused by a split transaction time-out occurring. A value of 1000 within the error field signals that a bus reset occurred.

The response code field rcode is a four bit field which holds the last response code value received. The value in the response code field will be equal to 1111 if the last transaction was a write transaction which was completed as a unified transaction.

The acknowledge in field is a four bit field which holds the last acknowledge signal received from the remote node in response to the last request packet generated by the asynchronous data pipe.

The acknowledge out field is a four bit field which holds the last acknowledge signal generated by the asynchronous data pipe in response to a response packet corresponding to a request packet generated by the corresponding asynchronous data pipe.

A write operation to the status field changes the value in the field. A read operation of this field returns the current status of the asynchronous data pipe and the present data transfer operation. If one of the request packets or a corresponding response packet results in an error, the asynchronous data pipe first stops generating any further request packets. The asynchronous data pipe then latches the values for the response code field rcode, the acknowledge in field ack-in and the acknowledge out field ack-out into the status field. After latching those values into the status field, the asynchronous data pipe then asserts an interrupt signal through the application interface to the application to notify the application that an error condition has occurred during the current data transfer operation.

Read Operations

When conducting a read operation and obtaining data from another node coupled to the bus structure and transferring the data to the application, an asynchronous data pipe generates the appropriate read request packets, using the information in the register file 80 as a template. When the data is then received from the destination node, the demultiplexer 42 routes the data to the appropriate asynchronous data pipe, using the values in the transaction code and transaction label fields. The asynchronous data pipe then strips the header information from the data packets and loads the data packets into the FIFO, from which the application can process the received data.

When active and transferring data from the bus structure 58 to the FIFO interface, each asynchronous data pipe operates as a data receive state machine, as defined in Table V below.

TABLE V

```
while (Active ( )) {
    if (RAM_Data == 0)    /* if no data to unload */
        continue;         /* loop to check active state */
                          /* we have free space and we're active */
    AssertReq ( );        /* assert req */
    while (!Ack( )
        && Active ( ));   /* wait for ack */
                          /* make sure we remain active */
    if (!Active ( ))      /* leave if we're not active any more */
        break;
    AssertWord ( );       /*assert word at the FIFO interface */
    DeAssertReq ( );      /* deassert req */
}
```

The FIFO interface clocks the data from an asynchronous data pipe into the corresponding FIFO with a clock signal synchronized to the bus structure interface. The FIFO is always in a condition to receive a word of data when it is available from the asynchronous data pipe. If the request signal becomes asserted when there is no room in the FIFO, then a FIFO overrun occurs. This creates an error condition which is detected by the corresponding asynchronous data pipe. When a FIFO overrun condition occurs, the remaining transactions are halted until the FIFO is cleared and ready to receive additional data. In this case, the acknowledge out field of the status register will reflect the error.

In order to read data from the bus structure, the originating application programs the appropriate information into the register file for the appropriate asynchronous data pipe. The appropriate value for the bus speed to be used, either 100 Mbps, 200 Mbps or 400 Mbps, is programmed into the speed field sp. The bus speed to be used should be within the capability of the physical interface 56 and supported by the bus structure 58. The appropriate value for the specific transaction to be completed is programmed into the transaction code field tCode. The appropriate value corresponding to the identifier of the destination node, across the bus structure, for all request packets, is programmed into the destination identifier field destination_ID.

The starting forty-eight bit destination offset value is programmed into the high and low destination offset fields destination_offset Hi and destination_offset Lo. If the non-incrementing bit in the control field is at a logical low voltage level, then the value in the destination offset fields is incremented after each request transaction is generated. The number of bytes for each request packet to be generated is programmed into the data length field data_length. If the value in the transaction code field tCode is equal to 0100, signalling that this transaction is a quadlet read transaction, then the value in the data length field data_length is equal to four. If the value in the transaction code field tCode is equal to 0101, signalling that this transaction is a block read transaction, then the value in the data length field data_length is programmed with an appropriate value in the range of numbers allowable for the programmed bus speed, as shown in Table III above. Because the operation to be completed is a read operation, and not a lock transaction, the value in the extended transaction code field extended_tCode is programmed to be equal to zero.

The number of packets to be generated and sent in order to complete this data transfer operation is programmed into the packet counter field. The value in the packet counter field can initially be programmed to equal zero, if the application is going to write to the packet counter bump field to generate the appropriate transactions, one at a time. The non-incrementing bit in the control field is programmed to equal a logical high voltage level if all request packets are to be sent to the same destination offset address. The non-incrementing bit in the control field is programmed to equal a logical low voltage level if the request packets are to be sent to an increasing range of addresses. The operational control bit go, within the control field, is programmed to equal a logical high voltage level in order to enable the asynchronous data pipe to begin generating the appropriate transactions necessary to complete the data transfer operation.

When the operational control bit go, within the control field, is set to a logical high voltage level, the asynchronous data pipe enters the active state. While in the active state, the asynchronous data pipe generates read request packets according to the read state machine as defined in Table VI.

TABLE VI

```
while (Active ( ) ) {
    if (packet_counter == 0)        /*if we don't have
                                      any packets to send*/
        continue;                   /*loop to verify active state*/
    if ((RAM_Free < data_length)    /*if we don't have
                                      enough free space*/
        && (RAM_Data !=0))          /*and we're not empty yet*/
        continue;                   /*loop to verify active state*/
                                    /*we have enough space
                                      for a packet*/
    Arbitrate ( );                  /*get access to the link core*/
    if (tCode ==4)                  /*if this is a quadlet*/
        SendHeaderRegs (12);        /*send first 12 bytes
                                      of header regs*/
    else                            /*else this is a block*/
```

TABLE VI-continued

```
        SendHeaderRegs (16);        /*send first 16 bytes
                                      of header regs*/
    /*note that we need to handle bad acks here*/
    GetData (data_length,           /*put received data
                                      into buffer RAM*/
        &RAM_Data, &RAM_Free);      /*adjust these as data arrives*/
    /*note that we need to handle back rcodes here*/
    --packet_counter;               /*decrement packet counter*/
    if (!non_increment)             /*if we're incrementing*/
        destination_offset += data_length;  /*increment destination*/
}
```

At any time, the originating application can write to the packet counter bump field, thereby incrementing the value in the packet counter field by one. The asynchronous data pipe read state machine, as defined in Table VI above, forms a read request packet whenever there is greater than one packet's worth of free space in the FIFO coupled to the active asynchronous data pipe. The asynchronous data pipe read state machine also forms a read request packet whenever the FIFO corresponding to the asynchronous data pipe is completely empty. If the embedded application guarantees that the data will be clocked out of the corresponding FIFO fast enough and with a short enough latency, the size of the FIFO corresponding to the asynchronous data pipe can be smaller than the number of bytes specified by the value in the data length field data_length within the register file 80.

For each read request packet that is generated by the asynchronous data pipe, the asynchronous data pipe expects the destination node to generate a corresponding read response packet. The demultiplexer uses the transaction code tCode and the transaction label t1 in the read response packet to route the packet to the proper asynchronous data pipe when multiple asynchronous data pipes are included within a system. The receiving asynchronous data pipe then strips the header and makes the data field available at the corresponding FIFO interface.

After each read request packet is generated, if the non-increment bit in the control field is not set to a logical high voltage level, the asynchronous data pipe increments the destination offset address value by the value in the data length field data_length in preparation for generating the next read request packet. Although not shown in the read state machine defined in Table VI above, the asynchronous data pipe examines the acknowledge in field for each write request packet it generates and the response code field rcode, for each corresponding read response packet. If either the acknowledge in field or the response code field rcode indicates an error, or if the asynchronous data pipe is forced to return a bad acknowledge code for the read response packet due to some error, the asynchronous data pipe immediately stops and stores both acknowledge codes and the response code rcode into the asynchronous data pipe status field within the register file 80. For split transactions, the asynchronous data pipe times the response. If more than 100 milliseconds elapses between the request packet and the corresponding response packet, the asynchronous data pipe halts and displays the denned status information in the status field of the register file 80.

Write Operations

When conducting a mite operation and sending data from the originating application to another node coupled to the bus structure, an asynchronous data pipe generates an appropriate header using the information in the register file 80 as a template. The header is then added to the appropriate data packet and both the header and the data packet are put onto the bus structure 58 by the link core 44. If the incrementing function is not disabled, the asynchronous data pipe increments the value in the destination offset fields and generates the header for the next packet of data. After each transaction is generated, the packet counter value is decremented. This process is repeated until the value in the packet counter field is equal to zero.

When active and transferring data from the FIFO to the bus structure 58, each asynchronous data pipe operates as a data send state machine, as defined in Table VII below.

TABLE VII

```
while (Active ( ) ) {
    if (RAM_Free == 0)    /* if no free space */
        continue;          /* loop to check active state */
                           /* we have free space and we're active */
    AssertReq ( ) ;        /* assert req */
    while (!Ack( )
        && Active ( ) );   /* wait for ack */
                           /* make sure we remain active */
    if (!Active ( ))       /* leave if we're not active any more */
        break;
    LatchWord ( ) ;        /* latch the word */
    DeAssertReq ( ) ;      /* deassert req */
}
```

The FIFO interface clocks the data from the FIFO to the corresponding asynchronous data pipe with a clock which is synchronized to the bus structure interface. The FIFO always has a word of data available when the asynchronous data pipe requests one. If the request signal Req becomes asserted when there is no data in the FIFO, then a FIFO underrun occurs. This creates an error which is detected and handled by the corresponding asynchronous data pipe. The application is responsible for ensuring that the appropriate data is stored in the FIFO for transferring across the bus structure 58. When a FIFO underrun occurs, the remaining transactions are halted until tire FIFO has additional data to send.

In order to write data to the bus structure 58, the application programs the appropriate information into the register file for the appropriate asynchronous data pipe. The appropriate value for the bus speed to be used, either 100 Mbps, 200 Mbps or 400 Mbps, is programmed into the speed field sp. The bus speed to be used is selected to be within the capability of the physical interface 56 and supported by the bus structure 58. The appropriate value for the specific transaction to be completed is programmed into the transaction code field tCode. If the requests are to be quadlet write requests, a value of 0000 is programmed into the transaction code field tCode. If the requests are to be block write requests, a value of 0001 is programmed into the transaction code field tCode. The appropriate value corresponding to the identifier of the destination node, across the bus structure, for all request packets, is programmed into the destination identifier field destination_ID.

The starting forty-eight bit destination offset value is programmed into the high and low destination offset fields destination_offset Hi and destination_offset Lo. If the non-incrementing bit in the control register is at a logical low voltage level, then the value in the destination offset fields of the register file 80 is incremented after each request transaction is completed. The number of bytes for each request packet to be generated is programmed into the data length field data_length. If the value in the transaction code field tCode is equal to 0000, signalling that this transaction is a quadlet write transaction, then the value in the data length field data_length will be equal to four. If the value in the transaction code field tCode is equal to 0001, signalling that this transaction is a block write transaction, then the value in the data length field data_length is programmed with an appropriate value in the range of numbers allowable for the programmed bus speed, as shown in Table III above. Because the operation to be completed is a write operation, the value in the extended transaction code field extended_tCode is programmed to be equal to zero.

The number of packets to be generated and sent in order to complete this transaction is programmed into the packet counter field. The value in the packet counter field can initially be programmed to equal zero, if the application is going to write to the packet counter bump field to generate the appropriate transactions, one at a time. The non_incrementing bit in the control field is programmed to equal a logical high voltage level if all request packets are to be sent to the same destination offset address. The non_incrementing bit in the control field is programmed to equal a logical low voltage level if the request packets are to be sent to an increasing range of addresses. The operational control bit go within the control field is programmed to equal a logical high voltage level in order to enable the asynchronous data pipe to begin generating the appropriate transactions necessary to complete the data transfer operation.

When the operational control bit go, within the control field of the register file 80, is set to a logical high voltage level, the asynchronous data pipe enters the active state. While in the active state, the asynchronous data pipe generates request packets according to the write state machine as defined in Table VIII below.

TABLE VIII

```
while (Active ( ) ) {
    if (packet_counter == 0)      /*if we don't have any packets to send*/
        continue                   /*loop to verify active state*/
    if ((RAM_Data <                /*if we don't have enough data*/
    data_length)
        && (RAM_Free !=0))         /*and we're not filled yet*/
        continue;                  /*loop to verify active state*/
                                   /*we have enough data for a packet*/
    Arbitrate ( );                 /*get access to the link core*/
    if (tCode ==0)                 /*if this is a quadlet*/
        SendHeaderRegs (12);       /*send first 12 bytes of header regs*/
    else                           /*else this is a block*/
        SendHeaderRegs (16);       /*send first 16 bytes of header regs*/
    SendData (data_length,         /*send data field from buffer RAM*/
        &RAM_Data,                 /*adjust these as data is transferred*/
        &RAM_Free);
    if (ack == pending)            /*if ack code is pending*/
        WaitResponse ( );          /*wait for the response packet*/
/*note that we need to handle bad ack codes and bad rcode's here*/
    --packet_counter;              /*decrement packet counter*/
    if (!non_increment)            /*if we're incrementing*/
        destination_offset += data_length;   /*increment destination*/
}
```

At any time, the originating application can write to the packet counter bump field, thereby incrementing the value in the packet counter field by one. The asynchronous data pipe write state machine, as defined in Table VIII above, forms a write request packet whenever there is greater than one packet's worth of data in the FIFO coupled to the active asynchronous data pipe. The asynchronous data pipe write state machine also forms a write request packet whenever the FIFO corresponding to the asynchronous data pipe is completely filled. If the embedded application guarantees that the data will be clocked into the corresponding FIFO fast enough and with a short enough latency, the size of the FIFO corresponding to the asynchronous data pipe can be smaller than the number of bytes specified by the value in the data length field data_length within the register file 80.

After each write request packet is generated, if the non-increment bit in the control field is not set to a logical high voltage level, the asynchronous data pipe increments the destination offset address value by the value in the data length field data_length in preparation for generating the next write request packet. Although not shown in the write state machine defined in Table VIII, the asynchronous data pipe examines the acknowledge in field for each write request packet it generates and the response code field rcode, if the destination node generates a write response packet. If either the acknowledge in field or the response code field rcode indicates an error, or if the asynchronous data pipe is forced to return a bad acknowledge code for the write response packet due to some error, the asynchronous data pipe immediately stops and stores both acknowledge codes and the response code rcode into the asynchronous data pipe status field in the register file 80. For split transactions, the asynchronous data pipe times the response. If more than 100 milliseconds elapse between the request packet and the corresponding response packet, the asynchronous data pipe halts and displays the defined status information in the status field of the register file 80.

In the preferred embodiment of the present invention, the bus structure 58 is an IEEE 1394 standard bus structure. Each asynchronous data pipe therefore generates transactions, headers, requests and responses in the format required by the IEEE 1394 standard. It will be apparent to those skilled in the art that the asynchronous data pipe of the present invention can be used with other types of bus structures and systems. In such systems, the asynchronous data pipe will be adapted to generate transactions, headers, requests and responses, as appropriate for the specific bus structure.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. An asynchronous data pipe configured for coupling between an application and a bus structure for automatically controlling asynchronous data transfer operations to and from the application over the bus structure comprising:
   a. an application interface circuit coupled to a system bus, wherein the application interfaces to the application interface circuit via the system bus; and
   b. a register file coupled to the application interface circuit for receiving parameters regarding a data transfer operation, wherein the register file is programmed and initiated by the application,
   wherein the application interface circuit automatically generates the transactions necessary to complete the data transfer operation between the application and a node coupled to the bus structure, without direct processor control.

2. The asynchronous data pipe as claimed in claim 1 wherein the register file is used as a template for generating the transactions necessary to complete the data transfer operation.

3. The asynchronous data pipe as claimed in claim 2 wherein the register file comprises registers for bus speed, transaction label, transaction code, destination node identifier, destination offset address, length of each data packet, packet counter, packet counter bump field, control field and status field.

4. The asynchronous data pipe as claimed in claim 2 further comprising a data buffer coupled to the application for sending data to and receiving data from the application.

5. The asynchronous data pipe as claimed in claim 4 wherein the bus structure is an IEEE 1394 standard bus structure.

6. A network of devices comprising:
   a. an application within one of the network devices, wherein the application is coupled to a system bus within the one of the network of devices;
   b. a bus structure coupled to the network of devices for transmitting communications between the network of devices; and
   c. an asynchronous data pipe within the one of the network devices, coupled between the application and the bus structure for automatically controlling asynchronous data transfer operations to and from the application over the bus structure, the asynchronous data pipe comprising:
      i. an application interface circuit coupled to the system bus, wherein the application interfaces to the application interface circuit via the system bus; and
      ii. a register file coupled to the application interface circuit for receiving parameters regarding a data transfer operation, wherein the register file is programmed and initiated by the application,
      wherein the application interface circuit automatically generates the transactions necessary to complete the data transfer operation between the application and another device in the network of devices, without direct processor control.

7. The network of devices as claimed in claim 6 wherein the register file of the asynchronous data pipe is used as a template for generating the transactions necessary to complete the data transfer operation.

8. The network of devices as claimed in claim 7 wherein the register file of the asynchronous data pipe comprises registers for bus speed, transaction label, transaction code, destination node identifier, destination offset address, length of each data packet, packet counter, packet counter bump field, control field and status field.

9. The network of devices as in claim 7 further comprising a data buffer coupled to the application for sending data to and receiving data from the application.

10. The network of devices as claimed in claim 9 wherein the bus structure is an IEEE 1394 standard bus structure.

* * * * *